(12) United States Patent
King

(10) Patent No.: US 7,823,610 B2
(45) Date of Patent: Nov. 2, 2010

(54) REFUELING SHUT-OFF SYSTEM WITH FILL-LIMIT VENT VALVE

(75) Inventor: Timothy J. King, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 876 days.

(21) Appl. No.: 11/624,588

(22) Filed: Jan. 18, 2007

(65) Prior Publication Data

US 2007/0169842 A1    Jul. 26, 2007

Related U.S. Application Data

(60) Provisional application No. 60/743,155, filed on Jan. 20, 2006.

(51) Int. Cl.
*B65B 1/04* (2006.01)

(52) U.S. Cl. .............................. 141/303; 141/5; 141/7; 141/8; 141/59; 141/302; 137/43; 137/202

(58) Field of Classification Search .................. 141/4–8, 141/59, 65, 95, 198, 285, 301–303; 137/43, 137/202
See application file for complete search history.

(56) References Cited

U.S. PATENT DOCUMENTS

| 5,014,742 | A  | * | 5/1991 | Covert et al. ................ 137/588 |
| 5,449,029 | A  |   | 9/1995 | Harris |
| 5,535,772 | A  |   | 7/1996 | Roetker et al. |
| 6,035,884 | A  |   | 3/2000 | King et al. |
| 6,170,510 | B1 | * | 1/2001 | King et al. ................. 137/202 |
| 6,170,538 | B1 |   | 1/2001 | Devall |
| 6,206,057 | B1 | * | 3/2001 | Benjey et al. ............... 141/198 |
| 6,533,002 | B1 | * | 3/2003 | Kobayashi et al. .......... 141/302 |
| 6,779,544 | B2 |   | 8/2004 | Devall |

\* cited by examiner

*Primary Examiner*—Timothy L Maust
(74) *Attorney, Agent, or Firm*—Barnes & Thornburg LLP

(57) ABSTRACT

A refueling shut-off system is provided for use with a vehicle fuel system including a fuel tank, a fuel tank filler neck, and a fuel vapor recovery canister. The system includes a fill-limit vent valve and a flow-control valve.

15 Claims, 9 Drawing Sheets

REFUELING SHUT-OFF SYSTEM WITH FILL-LIMIT VENT VALVE

This application claims priority under 35 U.S.C. §119(e) to U.S. Provisional Application Ser. No. 60/743,155, filed Jan. 20, 2006, which is expressly incorporated by reference herein.

BACKGROUND

The present disclosure relates to a vent apparatus for regulating discharge of fuel vapor from a fuel tank, and particularly to an apparatus for venting fuel vapor laden with hydrocarbon material from the vapor space in a fuel tank to a charcoal canister. More particularly, the present disclosure relates to a refueling ventilation and fill-limit system for controlling tank ventilation and for preventing overfilling of a fuel tank.

Vehicle fuel systems include valves associated with a fuel tank and configured to vent pressurized or displaced fuel vapor from the fuel tank to a vapor recovery canister located outside the fuel tank. The canister is designed to capture and store hydrocarbons entrained in fuel vapors that are vented in the fuel tank. Pressurized fuel vapor is discharged from the fuel tank to the canister during a typical vehicle refueling operation. Later, hydrocarbons are purged from the canister and burned in a vehicle engine.

Fill-limit vent valves are coupled to fuel tanks and configured to "open" and vent fuel vapor from a vapor space in a fuel tank to a canister during early stages of refueling but "close" to stop further venting when the tank is full. Closure of the fill-limit vent valve blocks flow of fuel vapor to the canister. This causes fuel vapor pressure to increase in the fuel tank vapor space to displace liquid fuel extant in the fuel tank causing some of that displaced liquid fuel to flow out of the fuel tank and into the filler neck. The displaced fuel moves upwardly in the filler neck in a direction toward a fuel-dispensing pump nozzle arranged to extend into the mouth of the filler neck. The upwardly moving liquid fuel reaches the nozzle and actuates a shut-off mechanism or sensor associated with the pump nozzle. Pump nozzles are known to include a fill-limiting sensor and a shut-off mechanism coupled to the sensor and configured to shut off the flow of fuel from the nozzle into a fuel tank filler neck whenever the tank is full and liquid fuel "backs up" the filler neck to splash onto or reach the fill-limiting sensor located on the nozzle.

SUMMARY

A refueling shut-off system in accordance with the present disclosure is configured to create vacuum conditions in a fuel tank filler neck during fuel tank refueling to activate a vacuum-sensitive nozzle-shutoff mechanism associated with a fuel-dispensing pump nozzle to set the fuel tank liquid level in the fuel tank and to shut off the flow of liquid fuel from the pump nozzle into the fuel tank at the proper time when the tank is full. In use, in illustrative embodiments, the vacuum conditions are created in a region of the filler neck receiving the vacuum-sensitive nozzle-shutoff mechanism using both liquid-sensing and pressure-sensing valves exposed to liquid fuel and pressurized fuel vapor extant in the fuel tank.

In illustrative embodiments, the refueling shut-off system comprises a tank-mounted vent unit coupled to a fuel vapor recovery canister by a fuel vapor discharge conduit and to a sealed fuel-transfer passageway formed in the filler neck by a fuel vapor recirculation conduit. The vent unit includes a fill-limit vent valve exposed to liquid fuel extant in the fuel tank and a flow-control valve exposed to pressurized fuel vapor discharged from the fuel tank and vacuum conditions generated in the filler neck.

In illustrative embodiments, the vent unit also includes a first rollover valve exposed to liquid fuel extant in the fuel tank. A liquid-fuel check valve is included in the fuel vapor recirculation conduit to allow flow of pressurized fuel vapor from the vent unit to the fuel-transfer passageway in the filler neck and communication of a vacuum in the fuel-transfer passageway to the flow-control valve in the vent unit without allowing liquid fuel flowing in the filler neck to reach the vent unit via the fuel vapor recirculation conduit.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
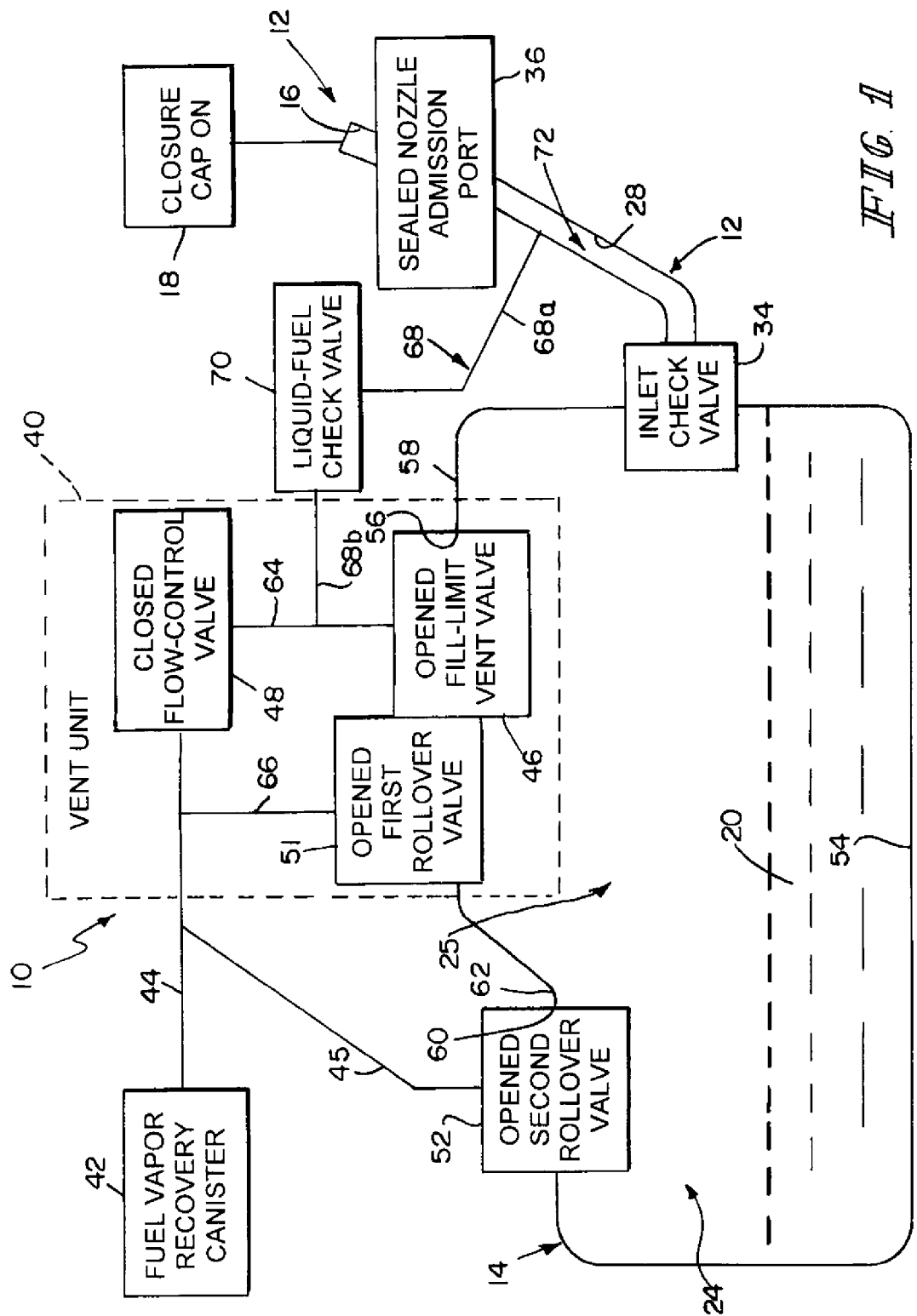
FIG. 1 is a diagrammatic view showing a fuel tank vent system associated with a fuel tank and a fuel tank filler neck and configured to include a refueling shut-off system in accordance with the present disclosure, the refueling shut-off system including a tank-mounted vent unit coupled to a fuel vapor recovery canister by a fuel vapor discharge conduit and to a "sealed" fuel-transfer passageway in the filler neck by a fuel vapor recirculation conduit containing a liquid-fuel check valve, the tank-mounted vent unit including a fill-limit vent valve, a flow-control valve, and a first rollover valve and showing a second rollover valve mounted elsewhere on the fuel tank and a closure cap mounted on the filler neck of a nearly empty fuel tank before the start of any tank-refueling activity.

A diagrammatic illustration of a refueling shut-off system 10 for use in a vehicle fuel system is shown in FIG. 1. A tank refueling sequence is shown, for example, in FIGS. 2-5. Opening and closing of certain illustrative valves included in refueling shut-off system 10 during a tank refueling activity are shown in FIGS. 8-11.

A filler neck 12 is coupled to a fuel tank 14 at one end and formed to include an open mouth 16 closed normally by a removable closure cap 18 as shown in FIG. 1. During tank refueling activity, closure cap 18 is removed as suggested in FIG. 2 and liquid fuel 20 is pumped from a fuel supply 22 into an interior region 24 formed in fuel tank 14 by a fuel-dispensing pump nozzle 26 through a fuel-conducting passageway 28 formed in filler neck 12. A vacuum-sensitive nozzle shut-off mechanism 30 associated with fuel-dispensing pump nozzle 26 is activated by a high-level aspiration-induced vacuum 76 developed in fuel-conducting passageway 28 (in a manner described herein) as suggested in FIG. 5 when the level of liquid fuel 20 extant in interior region 24 of fuel tank 14 rises to a "full-tank" level 103 to shut off fuel-dispensing pump nozzle 26 and stop further flow of liquid fuel 20 from fuel supply 22 into fuel tank 14.

Figure 5:
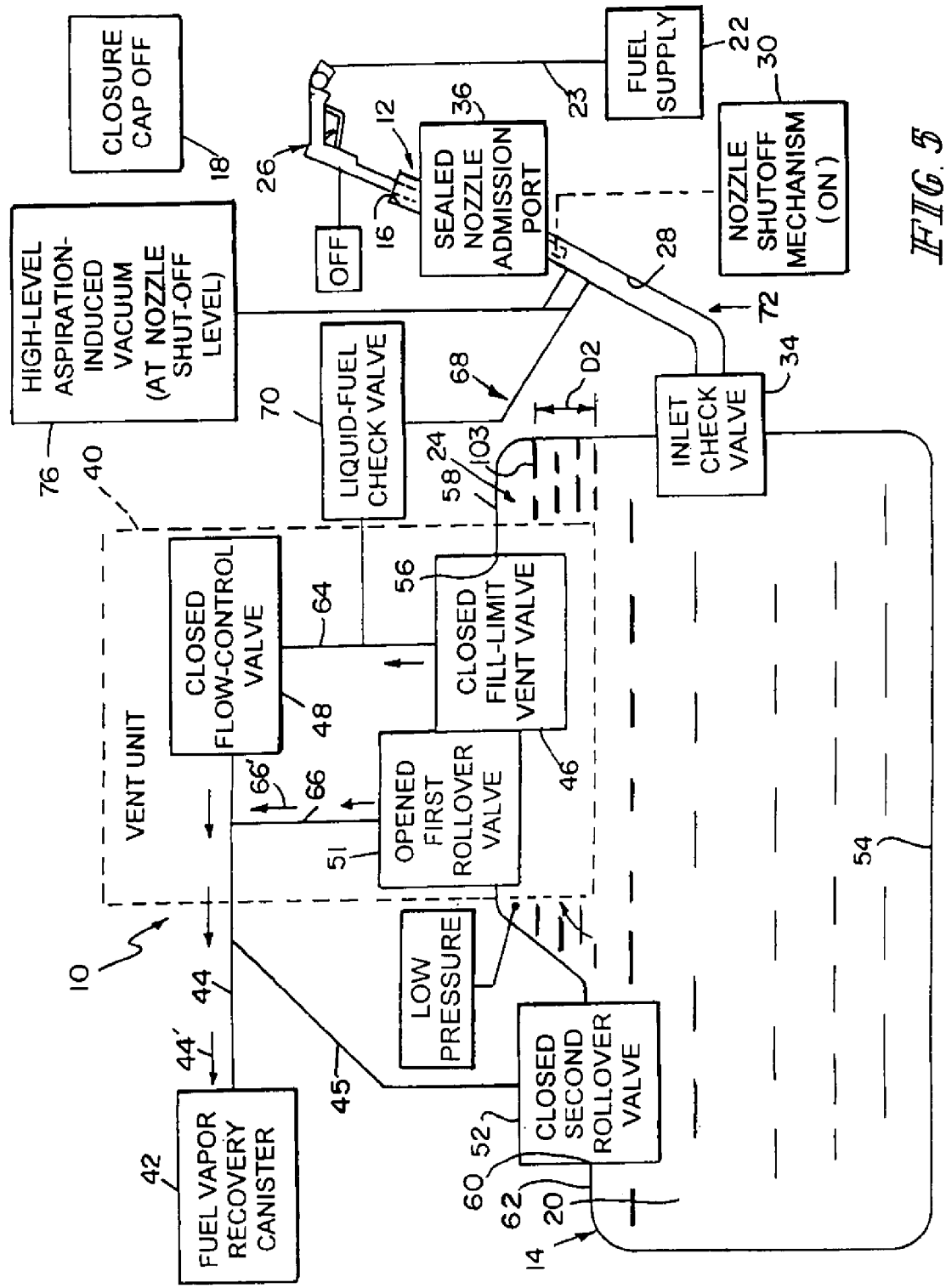
FIG. 5 is a diagrammatic view similar to FIGS. 1-4 showing that exposure of a fill-limit sensor on the fuel-dispensing pump nozzle to the high-level aspiration-induced vacuum was sufficient to "activate" the fill-limit sensor and actuate a shut-off mechanism associated with the fuel-dispensing pump nozzle to halt further discharge of liquid fuel into the filler neck and fuel tank and showing that the level of liquid fuel in the fuel tank has risen further (as compared to FIG. 4) to reach a "full-tank" level.
Figure 6:
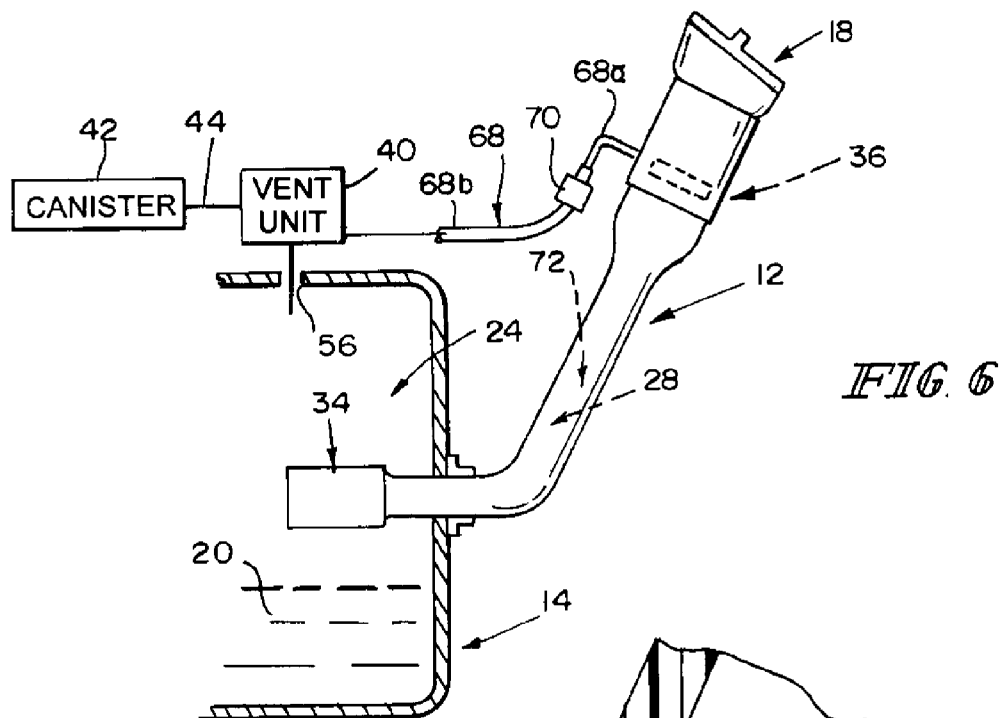
FIG. 6 is a perspective view of a portion of an illustrative fuel tank vent system in accordance with the disclosure in FIGS. 1-5 showing a fuel tank, a filler neck formed to include a fuel-transfer passageway between an inlet check valve and a "hard" seal provided in a sealed nozzle admission port and closed by a fuel cap, and a fuel vapor recirculation conduit containing a check valve and communicating with the fuel-transfer passageway in the filler neck.
Figure 7:
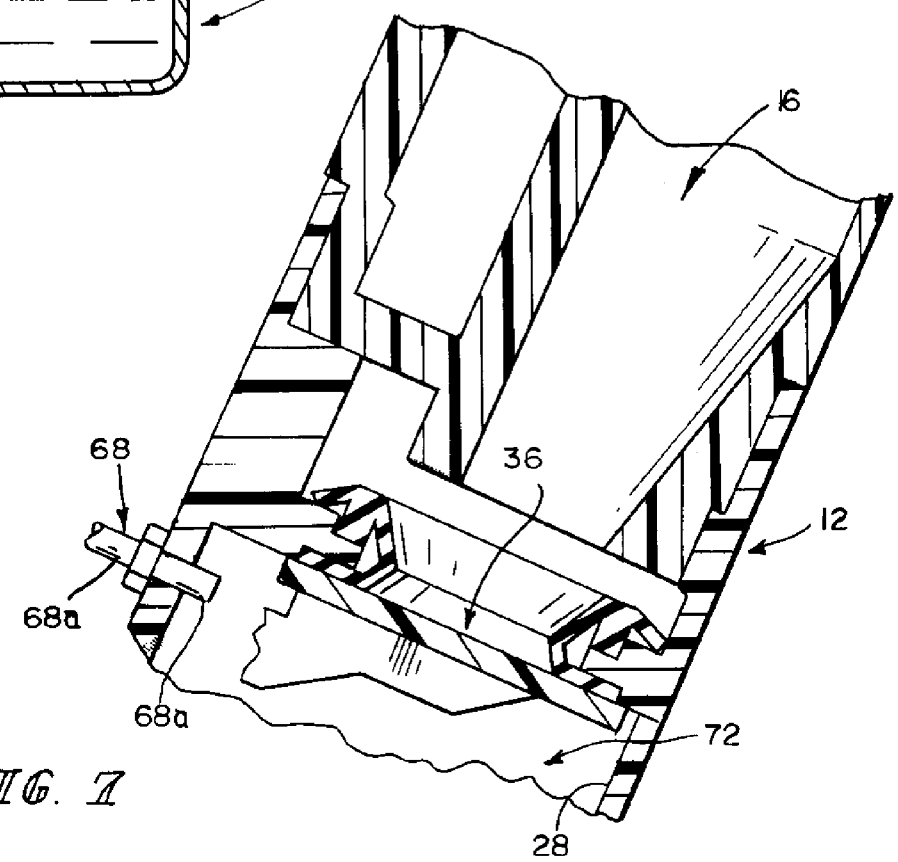
FIG. 7 is an enlarged sectional view of an illustrative sealed nozzle admission port ("hard seal") in accordance with the disclosure in FIGS. 1-6.

Flow of liquid fuel and fuel vapor in filler neck 12 is regulated by inlet check valve 34 and sealed nozzle admission port 36 as suggested diagrammatically in FIG. 1 and illustratively in FIGS. 6 and 7. Inlet check valve 34 is provided at a junction between fuel tank 14 and filler neck 12 to regulate flow of liquid fuel 20 between interior region 24 of fuel tank 14 and fuel-conducting passageway 28 of filler neck 12. Reference is made to U.S. Pat. No. 5,568,828 and application Ser. No. 10/810,982, filed Mar. 26, 2004, which patent and application are hereby incorporated in their entirety by reference herein, for descriptions of vehicle fuel systems and suitable inlet check valves. Sealed nozzle admission port 36 is provided in filler neck 12 near mouth 16 to establish a sealed connection between fuel-dispensing pump nozzle 26 and filler neck 12 when pump nozzle 26 is inserted into mouth 16 of filler neck 12 during a tank refueling activity as suggested in FIGS. 2-5. Reference is made to U.S. Pat. No. 6,170,538, which patent is hereby incorporated in its entirety by reference herein, for descriptions of suitable nozzle seal systems.

A vent unit 40 is coupled to fuel tank 14 and configured to regulate flow of fuel vapor 44' discharged from interior region 24 of fuel tank 14 to a fuel vapor recovery canister 42 via a fuel vapor discharge conduit 44 as suggested in FIG. 1. In an illustrative embodiment, vent unit 40 comprises a fill-limit vent valve (FLVV) 46, a flow-control valve 48, and a first rollover (grade) valve 51. Vent unit 40 is mounted in an aperture 56 formed in a first top wall 58 of fuel tank 14 and arranged to receive pressurized fuel vapor extant in a vapor space 25 provided above a pool of liquid fuel 20 stored in interior region 24 of fuel tank 14.

A second rollover valve 52 is mounted in an aperture 60 formed in a second top wall 62 of fuel tank 14 as also suggested in FIG. 1. An exhaust conduit 45 conducts fuel vapor 45' discharged from second rollover valve 52 to fuel vapor discharge conduit 44 as suggested in FIG. 2. First top wall 58 is arranged to lie at a higher elevation relative to floor 54 of fuel tank 14 than second top wall 62 as suggested in FIG. 1. It is within the scope of this disclosure to vary the location, elevation, size, and shape of top walls 58, 62.

Fill-limit vent valve 46 is exposed to fuel vapor extant in interior region 24 of fuel tank 14 (via aperture 56) and is configured to regulate discharge of such fuel vapor from fuel tank 14 to fuel vapor recovery canister 42 through vent unit 40. A vent line 64 included in vent unit 40 conducts fuel vapor 64' discharged from fill-limit vent valve 46 to flow-control valve 48. Fuel vapor discharge conduit 44 conducts fuel vapor discharged from flow-control valve 48 to fuel vapor recovery canister 42. A vent channel 66 included in vent unit 40 conducts fuel vapor 66' discharged from first rollover valve 51 to fuel vapor discharge conduit 44 for delivery to fuel vapor recovery canister 42.

Figure 2:
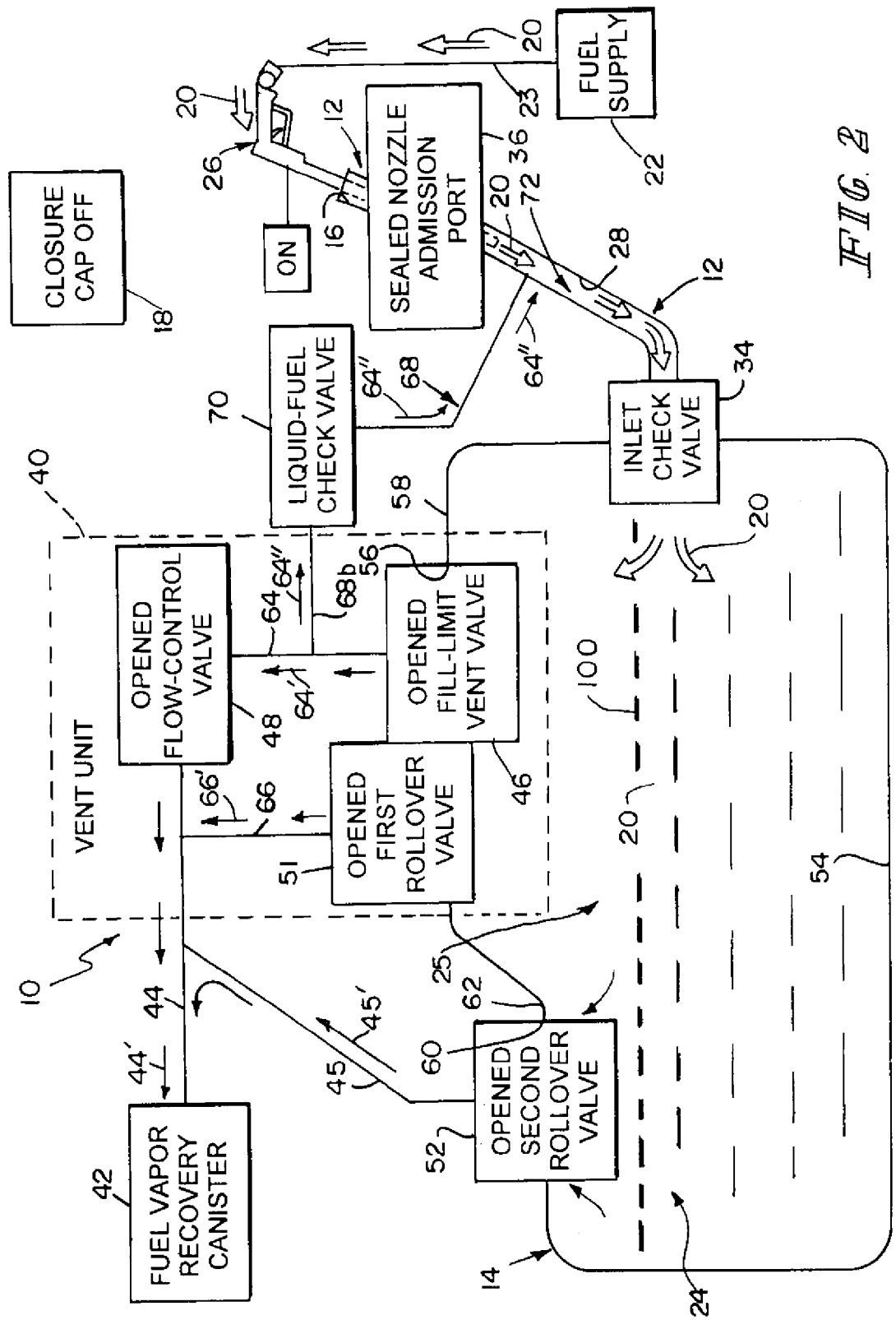
FIG. 2 is a diagrammatic view similar to FIG. 1 showing discharge of liquid fuel from a fuel-dispensing pump nozzle into the fuel tank through the filler neck, showing discharge of displaced fuel vapor from a vapor space in the fuel tank to (1) the fuel vapor recovery canister via the fuel vapor discharge conduit and (2) a fuel-transfer passageway in the filler neck via the fuel vapor recirculation conduit, and showing that the level of liquid fuel in the fuel tank has begun to rise during this tank-refueling activity as liquid fuel flows downwardly through the filler neck into the fuel tank.
Figure 3:
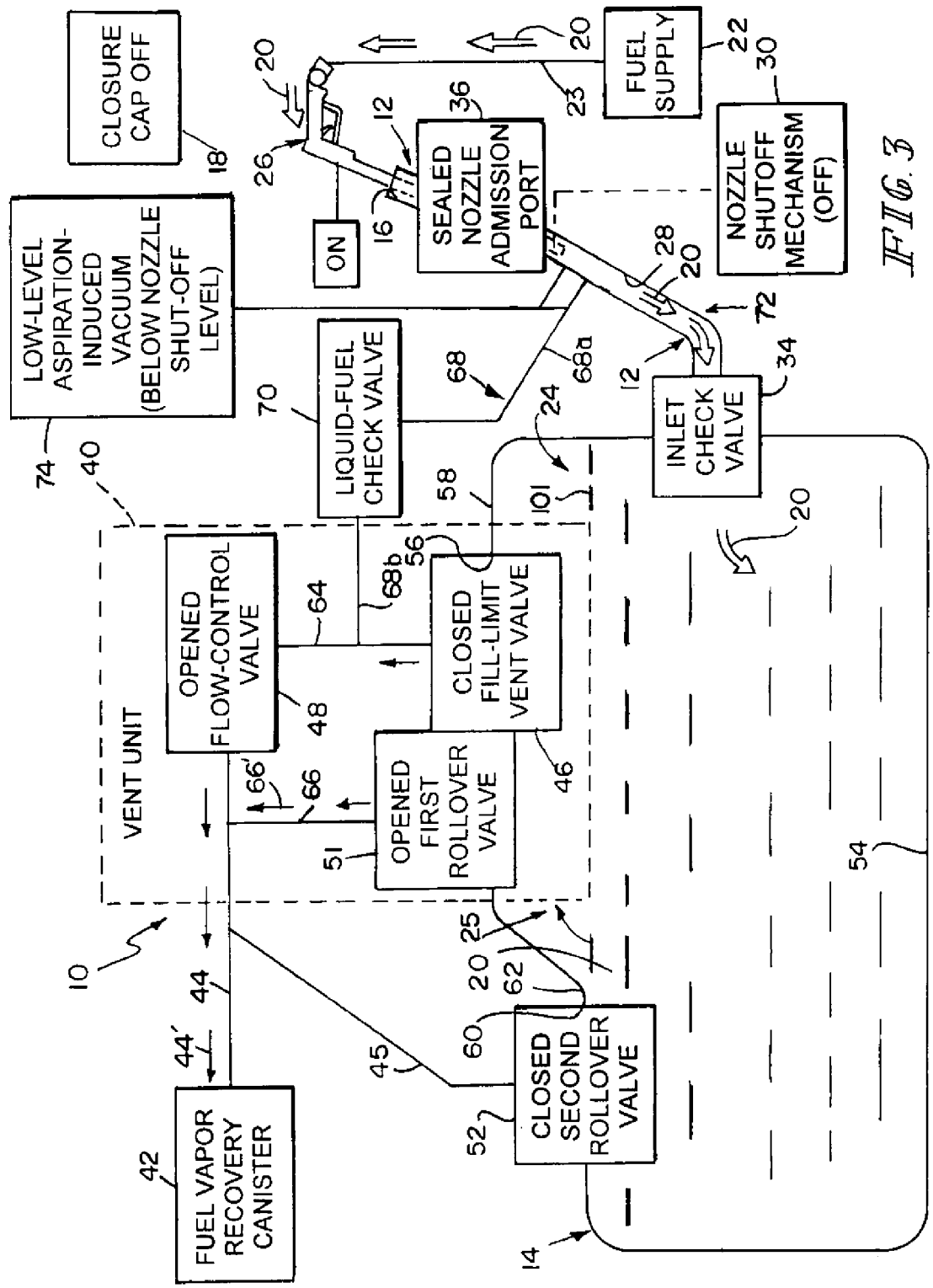
FIG. 3 is a diagrammatic view similar to FIGS. 1 and 2 showing movement of the fill-limit vent valve in the tank-mounted vent unit to a closed position (once the level of liquid fuel in the fuel tank has risen to a fill-limit vent valve closure level and the fuel tank is almost full) to block flow of pressurized fuel vapor from the fuel tank to the flow-control valve included in the tank-mounted vent unit and showing development of a "low-level" aspiration-induced vacuum in the fuel vapor recirculation conduit and the fuel-transfer passageway of the filler neck resulting from continued flow of liquid fuel in the filler neck and into the fuel tank.

Fill-limit vent valve 46 is normally "opened" to allow flow of fuel vapor 44' from vapor space 25 in interior region 24 of fuel tank 14 to flow-control valve 48 through vent line 64 as illustrated diagrammatically in FIGS. 1 and 2. During tank refueling, when the level of liquid fuel 20 extant in interior region 24 of fuel tank 14 rises to a "fill-limit valve-closure" level 101 as shown in FIG. 3, fill-limit vent valve 46 moves to assume a "closed" position to block flow of fuel vapor from fuel tank 14 through vent line 64 to flow-control valve 48. Operation of an illustrative fill-limit vent valve 46 in accordance with the present disclosure is shown in FIGS. 8-11 and described herein.

Flow-control valve 48 is normally "closed" to block flow of fuel vapor from vent line 64 to fuel vapor discharge conduit 44 as shown, for example, in FIG. 1. However, when fill-limit vent valve 46 opens and fuel vapor 64' flows in vent line 64, then flow-control valve 48 will move to assume an "opened" position as long as the pressure of the fuel vapor in vent line 64 exceeds a predetermined minimum pressure. Such opening of flow-control valve 48 will allow pressurized fuel vapor to flow through flow-control valve 48 to fuel vapor recovery canister 42 via fuel vapor discharge conduit 44. Operation of an illustrative flow-control valve 48 in accordance with the present disclosure is shown in FIGS. 8-11 and described herein.

First rollover valve 51 is normally "opened" to allow flow of fuel vapor 66' from vapor space 25 in interior region 24 of fuel tank 14 to fuel vapor discharge conduit 44 through vent channel 66. First rollover valve 51 is configured to block discharge of fuel vapor and liquid fuel from fuel tank 14 to vent channel 66, fuel vapor discharge conduit 44, and fuel vapor recovery canister 42 whenever first rollover valve 40 is "inverted" or at least tilted a selected number of degrees from its normal upright position to minimize any chance that carbon granules stored in fuel vapor recovery canister 42 will be exposed to liquid fuel 20 flowing through fuel vapor discharge conduit 44 during a vehicle or fuel tank "roll-over" situation.

Second rollover valve 52 is mounted in an aperture 60 formed in a "lower" second top wall 62 of fuel tank 14 and is separate from vent unit 40 and first rollover valve 52 included in vent unit 40. Second rollover valve 52 is configured to block discharge of fuel vapor and liquid fuel from fuel tank 14 to exhaust conduit 45, fuel vapor discharge conduit 44, and fuel vapor recovery canister 42 whenever second rollover valve is "inverted" or at least tilted a selected number of degrees from its normal upright position to minimize any chance that carbon granules stored in fuel vapor recovery canister 42 will be exposed to liquid fuel 20 flowing through fuel vapor discharge conduit 44 during a vehicle or fuel tank "roll-over" situation.

A fuel vapor recirculation conduit 68 containing a liquid-fuel check valve 70 is coupled at one end to vent line 64 and at an opposite end to filler neck 12 to communicate with fuel-conducting passageway 28 as suggested in FIG. 1. One leg 68a of conduit 68 interconnects filler neck 12 and check valve 70 and another leg 68b of conduit 68 interconnects vent line 64 and check valve 70. As suggested diagrammatically in FIG. 2, liquid fuel check valve 70 is configured to allow fuel vapor to flow from vent line 64 into fuel-conducting passageway 28 in filler neck 12 during tank refueling activity. However, liquid fuel check valve 70 is also configured to block any liquid fuel 20 that happens to flow from fuel-conducting passageway 28 into vapor recirculation conduit 68 from flowing into vent line 64 in vent unit 40.

Normally closed flow-control valve 48 includes a valve stopper housing 90 having an interior region 91 receiving outlet end 92 of vent line 64 therein and a stopper 93 mounted for movement in interior region 91 of valve stopper housing 90 between a closed position (shown in FIGS. 8 and 11) mating with outlet end 92 of vent line 64 to block flow of fuel vapor from vent line 64 into fuel vapor discharge conduit 44 and an opened position (shown in FIGS. 9 and 10) disengaging outlet end 92 of vent line 64 to allow fuel vapor 64' discharged from outlet end 92 of vent line 64 to flow into fuel vapor discharge conduit 44. Flow-control valve 48 also includes spring means (such as spring 94) for yieldably urging stopper 93 normally to the closed position and allowing stopper 93 to move from the closed position to the opened position in response to discharge of pressurized fuel vapor having a pressure magnitude in excess of a predetermined minimum from normally opened fill-limit vent valve 46 into vent line 64 during fuel tank refueling so that the pressurized fuel vapor exiting fuel tank 14 through normally opened fill-limit vent valve 46 is discharged into fuel vapor discharge conduit 44 via normally closed flow-control valve 48 while stopper 93 is moved to the opened position as suggested in FIG. 9.

Normally opened fill-limit vent valve 46 includes a valve closure housing 80 formed to include inlet and outlet ports 83, 84 and a closure 88 arranged to move in valve closure housing 80 between an opened position allowing flow of fuel vapor exiting interior region 24 of fuel tank 14 into vent line 64 and a closed position blocking flow of fuel vapor extant in interior region 24 of fuel tank 14 into vent line 64. Normally opened fill limit vent valve 46 also includes means (e.g., buoyant valve unit 85) for moving closure 88 from a normally opened position to the closed position in response to accumulation of liquid fuel 20 in interior region 24 of fuel tank 14 to a first predetermined amount defining a fill-limit vent valve closure level 101 as suggested, for example, in FIGS. 3 and 10 in the fuel tank 14 to block flow of pressurized fuel vapor from a vapor space provided in interior region 24 of fuel tank 14 into vent line 64 included in vent unit 40.

Figure 4:
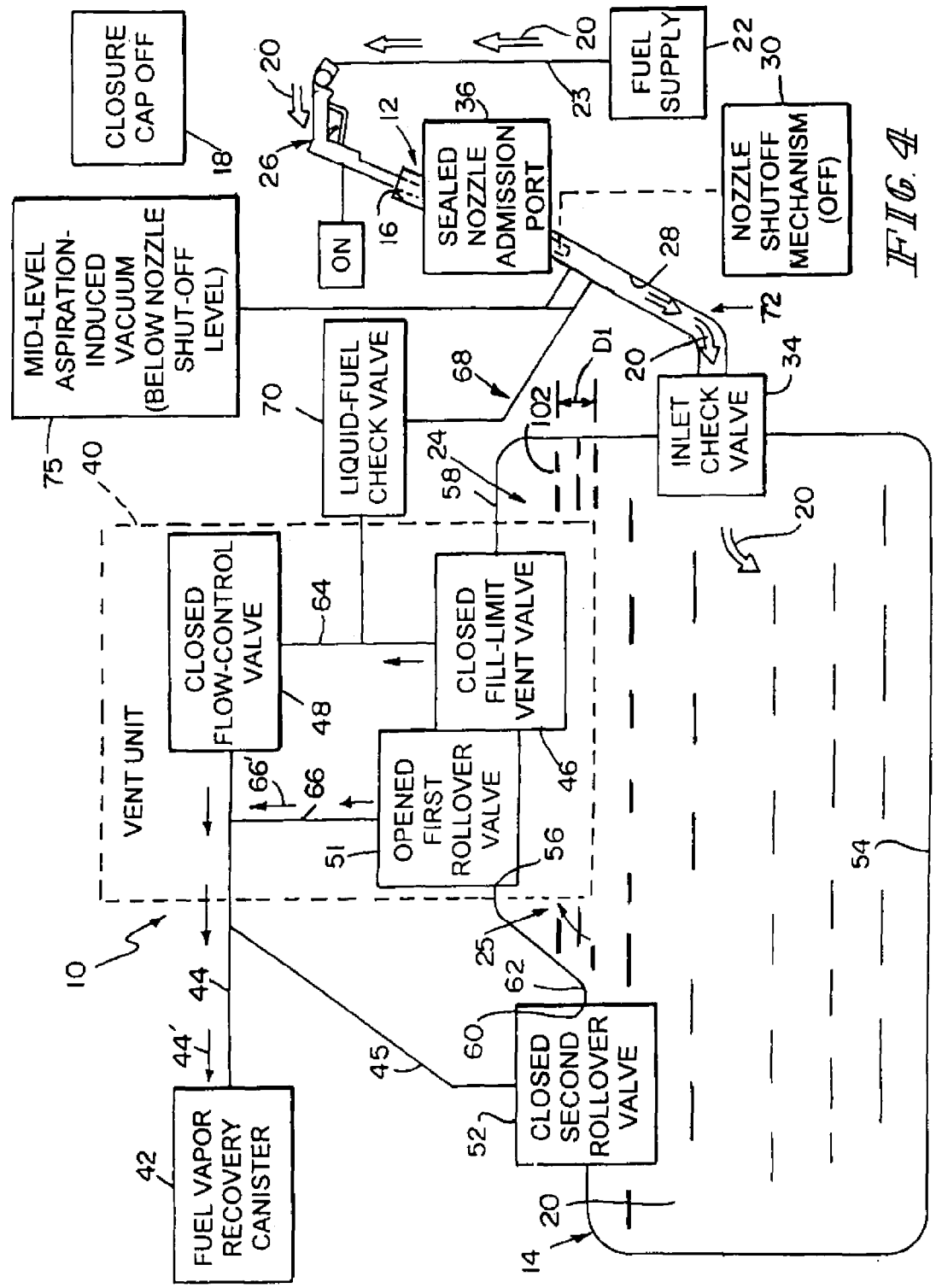
FIG. 4 is a diagrammatic view similar to FIGS. 1-3 showing that the level of liquid fuel in the fuel tank has risen to a higher level above the fill-limit vent valve closure level shown in FIG. 3 due to continued discharge of liquid fuel from the fuel-dispensing pump nozzle into the filler neck and fuel tank, showing development of a "mid-level" aspiration-induced vacuum in the fuel vapor recirculation conduit and in the fuel-transfer passageway of the filler neck resulting from continued flow of liquid fuel in the filler neck and into the fuel tank to cause a greater vacuum to be applied to the flow-control valve and showing that the flow-control valve in the tank-mounted vent unit moves to a closed position in response to exposure to the mid-level aspiration-induced vacuum extant in the fuel vapor recirculation conduit.
Figure 11:
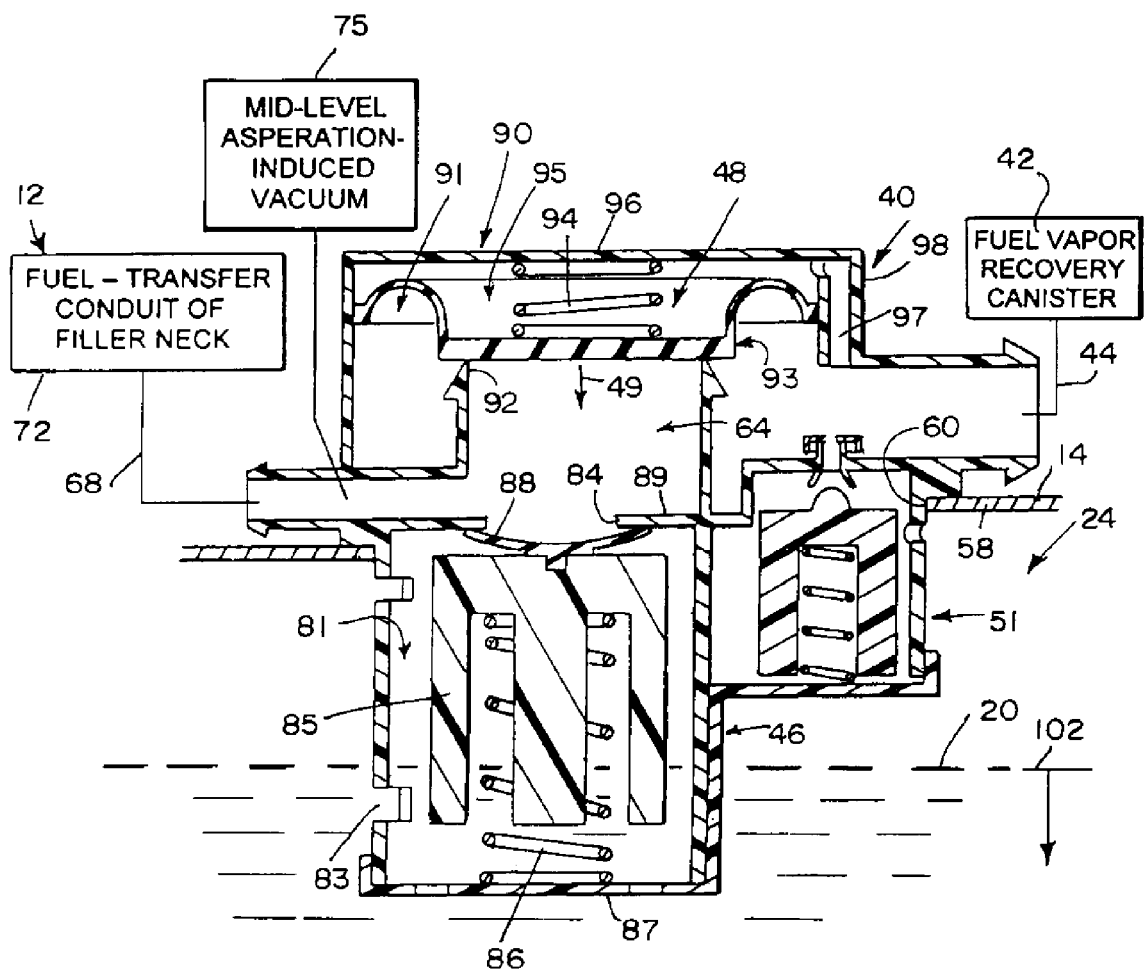
FIG. 11 is a view similar to FIGS. 8-10 of the tank-mounted vent unit in the condition shown diagrammatically in FIG. 4 showing the fill-limit vent valve still in the closed position and the flow-control valve after it has been moved to assume the closed position by suction forces applied to the flow-control valve and generated by a low-level aspiration-induced vacuum developed in the fuel-transfer passageway of the filler neck by the stream of liquid fuel flowing therethrough as suggested diagrammatically in FIG. 3.

Fuel vapor recirculation conduit 68 is configured to provide vacuum generator means for applying a mid-level aspiration-induced vacuum 75 to vent line 64 while closure 88 of the normally opened fill-limit vent valve 46 is located in the closed position upon accumulation of liquid fuel 20 in interior region 24 of fuel tank 14 to a second predetermined amount greater than the first predetermined amount and defining a flow-control valve closure level 102 as suggested, for example, in FIGS. 4 and 11, and in response to downward flow of liquid fuel 20 in fuel-conducting passageway 28 of filler neck 12 toward the first end thereof to cause stopper 93 to move from the opened position to assume the closed position before a relatively higher high-level aspiration-induced vacuum 76 is generated in fuel-conducting passageway 28 by continued downward flow of liquid fuel 20 in fuel-conducting passageway 28 of filler neck 12 to activate a vacuum-sensitive nozzle shut-off mechanism 30 associated with a fuel-dispensing pump nozzle 26 inserted into fuel-conducting passageway 28 through open mouth 16 of filler neck 12 and used to establish the downward flow of liquid fuel 20 in fuel-conducting passageway 28 of filler neck 12. Fuel vapor recirculation conduit 68 is configured to provide high-level vacuum generator means for applying a high-level aspiration-induced vacuum 76 that is greater than mid-level aspiration-induced vacuum 75 to vent line 64 while closure 88 of the normally opened fill-limit vent valve 46 is located in the closed position upon accumulation of liquid fuel 20 in interior region 24 of fuel tank 14 to a third predetermined amount 103 shown in FIG. 5 greater than the second predetermined amount 102 and in response to continued downward flow of liquid fuel 20 in fuel-conducting passageway 28 of filler neck 12 to generate a vacuum in fuel-conducting passageway 28 sufficient to activate a vacuum-sensitive nozzle shut-off mechanism 30 associated with a fuel-dispensing pump nozzle 26 inserted into fuel-conducting passageway 28 through open mouth 16 of filler neck 12 and used to establish the downward flow of liquid fuel 20 in fuel-conducting passageway 28 of filler neck 12.

Filler neck 12 is formed to include at the first end an inlet check valve 34 and at open mouth 16 a sealed nozzle admission port 36 configured to admit a fuel-discharge outlet of a fuel-dispensing pump nozzle 26 into fuel-conducting passageway 28 of filler neck 12 to establish a sealed connection therebetween so as to establish a sealed fuel-transfer conduit 72 located in fuel-conducting passageway 28 between inlet check valve 34 and sealed nozzle admission port 36. Sealed fuel-transfer conduit 72 is arranged to receive a vacuum-sensitive nozzle shut-off mechanism 30 associated with a fuel-dispensing pump nozzle 26 inserted into fuel-conducting passageway 28 through sealed nozzle admission port 36 and wherein fuel vapor recirculation conduit 68 is arranged to open into sealed fuel transfer conduit 72 established in fuel-conducting passageway 28 of filler neck 12.

Operation of refueling shut-off system 10 to stop further discharge of liquid fuel 20 from a fuel-dispensing pump nozzle 26 and end a tank refueling activity is illustrated diagrammatically in FIGS. 1-5. Operation of an illustrative shut-off system 10 is shown, for example, in FIGS. 8-11.

Initially, the level of liquid fuel 20 in fuel tank 14 is low as suggested in FIG. 1. Normally, at this "tank-empty" stage, first and second rollover valves 51, 52 are opened along with fill-limit vent valve 46. Only flow-control valve 48 is closed. Any pressurized fuel vapor extant in vapor space 25 of fuel tank 14 can flow to fuel vapor recovery canister 42 via opened first and second rollover valves 51, 52. Closure cap 18 will be removed to open mouth 16 of filler neck 12 to initiate fuel tank refueling.

Fuel-dispensing pump nozzle 26 is inserted into filler neck 12 and used to discharge liquid fuel 20 provided by fuel supply 22 and supply line 23 into interior region 24 of fuel tank 14 as shown, for example, in FIG. 2. Pump nozzle 26 extends through and mates with sealed nozzle admission port 36 to establish a sealed connection therebetween so as to establish a "sealed" fuel-transfer conduit 72 in fuel-conducting passageway 28 between inlet check valve 34 and sealed nozzle admission port 36. Liquid fuel 20 moving downwardly in sealed fuel-transfer conduit 72 is flowing with a "force" sufficient to move the normally closed inlet check valve 34 to an "opened" position so that liquid fuel 20 flows through inlet check valve 34 into interior region 24 of fuel tank 4. This causes the level of liquid fuel 20 in interior region 24 to rise to a higher level 100 as fuel tank 14 is being filled during a tank refueling activity as shown, for example, in FIG. 2.

During an early stage of tank refueling shown in FIG. 2, fuel vapor extant in a "vapor space" 25 provided in interior region 14 of fuel tank 14 is pressurized further as the fuel level rises causing fuel vapor to flow from vapor space 25 into fuel vapor discharge conduit 44 in a direction toward fuel vapor recovery canister 42 via opened first rollover valve 51 and vent channel 66 and via opened second rollover valve 52 and exhaust conduit 45. Pressurized fuel vapor 64' also flows through opened fill-limit vent valve 46 and vent line 64 to reach flow-control valve 48 and move flow-control valve 48 to assume an "opened" position as shown diagrammatically in FIG. 2 and illustratively in FIG. 9. In the opened position, pressurized fuel vapor 64' is allowed to flow from vent line 64 into fuel vapor discharge conduit 44 on its way toward fuel vapor recovery canister 42. At the same time, some of pressurized fuel vapor 64' in vent line 64 flows through vapor recirculation conduit 68 and liquid-fuel check valve 70 into sealed fuel transfer conduit 72 in fuel-conducting passageway 28 of filler neck 12.

As suggested in FIG. 3, fill-limit vent valve 46 moves to assume the closed position in response to accumulation of more liquid fuel 20 in fuel tank 14 sufficient to cause the level of liquid fuel 20 to rise to a "fill-limit vent valve" closure level 101. This movement blocks flow of pressurized fuel vapor from vapor space 25 in fuel tank 14 into vent line 64. A "low-level" aspiration-induced vacuum 74 is developed in fuel vapor recirculation conduit 68, vent line 64, and a portion of sealed liquid fuel transfer conduit 72 in fuel-conducting passageway 28 of filler neck 12 as shown diagrammatically in FIG. 3 owing to continued downward flow of liquid fuel 20 in filler neck 12 discharged from fuel-dispensing pump nozzle 26 past the mouth of leg 68*a* of fuel vapor recirculation conduit 68 opening into sealed liquid fuel transfer conduit 72 near the end of a tank refueling activity. At this stage, fuel tank 14 is nearly full but will still accept more liquid fuel 20 dispensed by pump nozzle 26 since the vacuum-sensitive nozzle shut-off mechanism 30 associated with pump nozzle 26 and exposed to low-level aspiration-induced vacuum is "off" and has not yet been activated. Liquid fuel 20 will be pumped automatically and continuously by pump nozzle 26 until vacuum-sensitive nozzle shut-off mechanism 30 is exposed to a predetermined "high-level" vacuum as 76 as suggested in FIG. 5.

As suggested in FIG. 4, the level of liquid fuel 20 in fuel tank 14 has risen a distance D1 (relative to level 101) to a higher "flow-control valve" closure level 102 due to continued discharge of liquid fuel 20 from fuel-dispensing pump nozzle 26 into filler neck 12. Continued downward liquid fuel 20 flow in sealed fuel-transfer conduit 72 of fuel-conducting passageway 28 leads to development of a "mid-level" aspiration-induced vacuum 75 in fuel vapor recirculation conduit 68 and first vent line 64. This vacuum 75 is greater than low-level aspiration-induced vacuum 74 and is applied to flow-control valve 48 via fuel vapor recirculation conduit 68 and vent line 64 to move flow-control valve 48 to assume the closed position as suggested in FIG. 4.

As suggested in FIG. 5, continued downward flow of liquid fuel into filler neck 12 causes the level of liquid fuel 20 in fuel tank 14 to rise a greater distance D2 relative to level 101 to a higher "full-tank" level 103 and a "high-level" aspiration-induced vacuum 76 to develop in sealed fuel-transfer conduit 72 (as well as fuel vapor recirculation conduit 68 and vent line 64), which high-level vacuum 76 is greater than vacuums 74 and 75 shown, respectively, in FIGS. 3 and 4. The magnitude of high-level aspiration-induced vacuum 76 is great enough to "activate" the vacuum-sensitive nozzle shut-off mechanism 30 that is associated with pump nozzle 26 and exposed to vacuum 76 in sealed fuel-transfer conduit 72. Such activation "shuts off" fuel-dispensing pump nozzle 26 automatically as shown in FIG. 5 when the level of liquid fuel 20 in fuel tank 14 reaches full-tank level 103 so that no more liquid fuel is dispensed into filler neck 12. The fuel tank refueling activity has now ended, pump nozzle 26 is withdrawn from filler neck 12, and closure cap 18 is remounted on filler neck 12.

Figure 8:
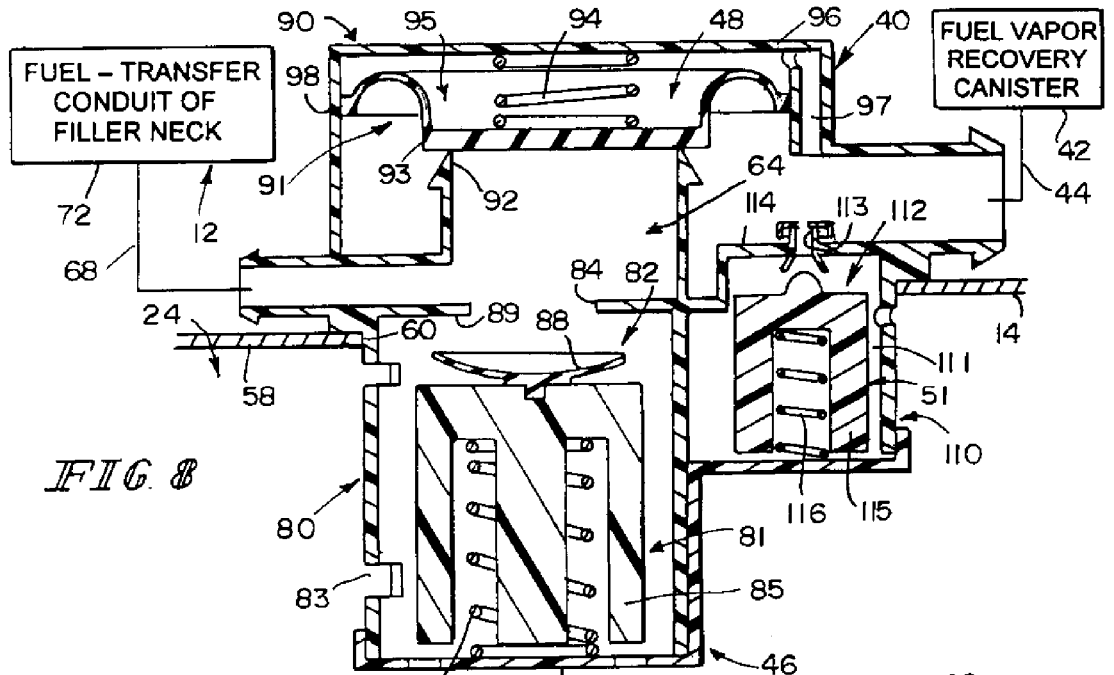
FIG. 8 is an illustrative schematic view of a tank-mounted vent unit of the type shown diagrammatically in FIG. 1 showing the flow-control valve in a normally closed position and the underlying fill-limit vent valve in a normally opened position when the level of liquid fuel in the fuel tank is relatively low.

An illustrative embodiment of tank-mounted vent unit 40 is shown, for example in FIGS. 8-11. Flow-control valve 48 is in a normally closed position and underlying fill-limit vent valve 46 is in a normally opened position as shown in FIG. 8 when the level of liquid fuel in fuel tank 14 is relatively low. First rollover valve 51 is shown in a normally opened position in FIGS. 8-11.

As suggested in FIG. 8, fill-limit vent valve 46 includes a valve closure housing 80 having an interior region 81 and a buoyant valve unit 82 arranged to move up and down in valve closure housing 80 in response to rising and falling levels of liquid fuel in interior region 81. Valve closure housing 80 is formed to include an inlet port 83 exposed to fuel vapor in vapor space 25 in fuel tank 14 and an outlet port 84 opening into vent line 64. In an illustrative embodiment, buoyant valve unit 82 comprises a float 85, a compression spring 86 for lifting float 85 away from floor 87 of valve closure housing 80, and a closure 88 coupled to float 85 and arranged to mate with a ceiling 89 in valve closure housing 80 to close the outlet port 84 formed in ceiling 89 as suggested in FIGS. 10 and 11. Reference is made to U.S. Pat. Nos. 6,779,544; 6,035,884; and 5,449,029, which references are incorporated in their entirety herein, for disclosure of suitable buoyant valves.

Figure 9:
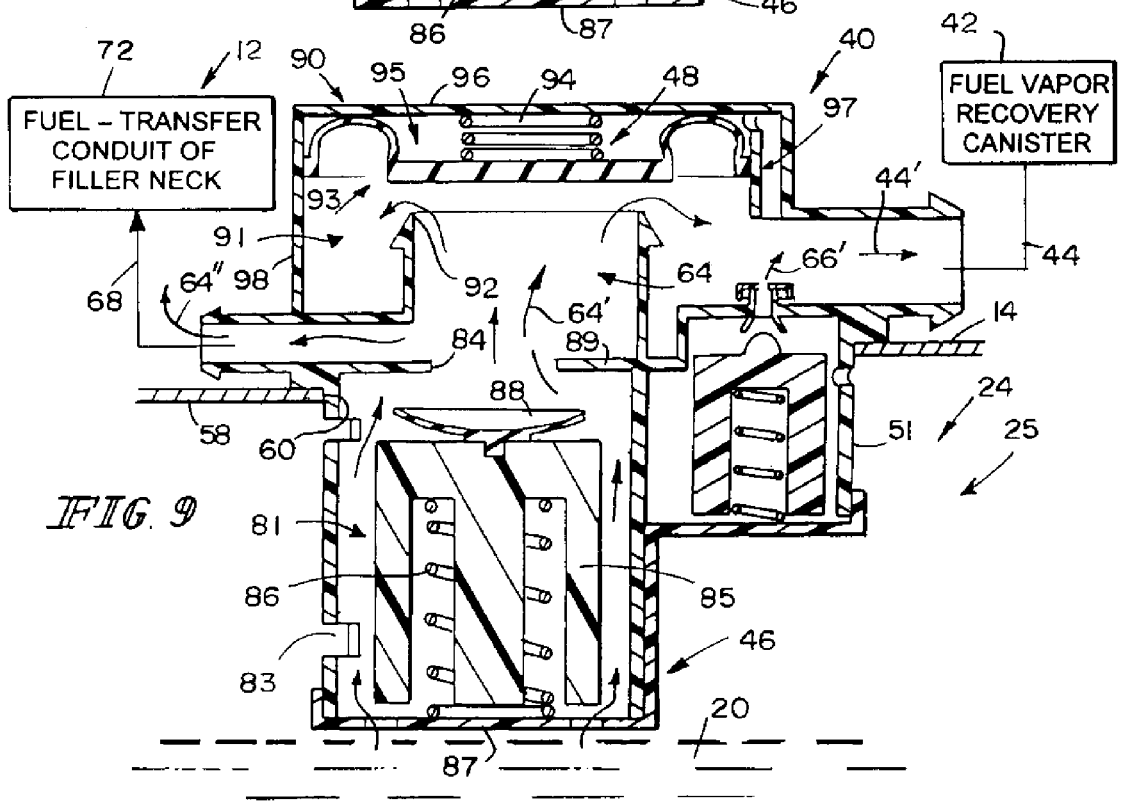
FIG. 9 is a view similar to FIG. 8 of the tank-mounted vent unit in the condition shown diagrammatically in FIG. 2 showing the fill-limit vent valve and the flow-control valve in the opened positions during a tank-refueling activity as displaced fuel vapor is discharged from the fuel tank to the fuel vapor recovery canister and to the fuel-transfer passageway of the filler neck.
Figure 10:
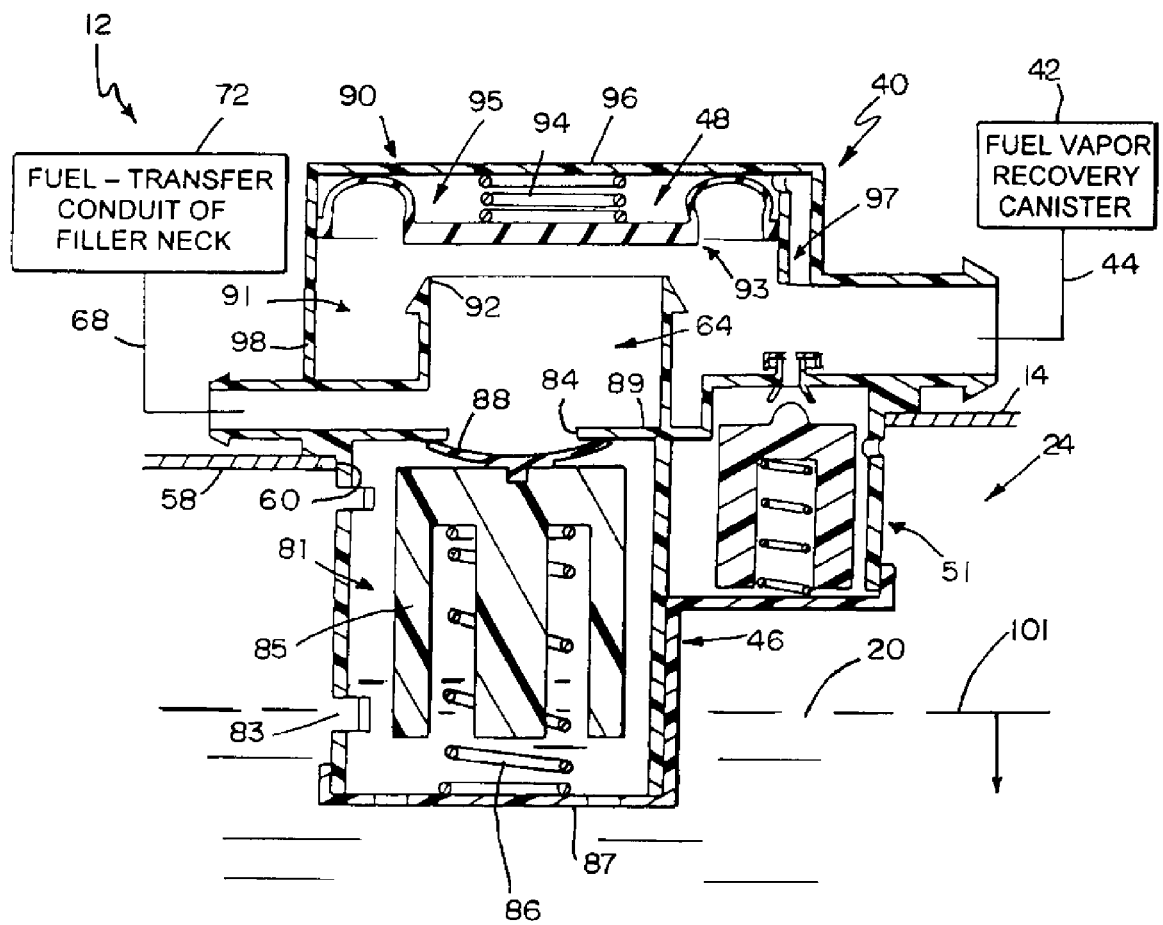
FIG. 10 is a view similar to FIGS. 8 and 9 of the tank-mounted vent unit in the condition shown diagrammatically in FIG. 3 showing the fill-limit vent valve in the closed position as a result of exposure of a spring-biased buoyant float in the fill-limit vent valve to a rising level of liquid fuel in the fuel tank and the flow-control valve in the opened position.

As suggested in FIG. 8, flow-control valve 48 includes a valve stopper housing 90 having an interior region 91 receiving an outlet end 92 of vent line 64 therein. A diaphragm 93 or stopper included in flow-control valve 48 is mounted for movement in interior region 91 between a "closed" position mating with outlet end 92 of vent line 64 as shown in FIGS. 8 and 11 and an "opened" position disengaging outlet end 92 of vent line 64 as shown in FIGS. 9 and 10. A spring 94 also included in flow-control valve 48 is provided normally to urge diaphragm 93 to the closed position.

In an illustrative embodiment shown in FIG. 8, diaphragm 93 is made of a suitable sealing material and has a peripheral edge coupled to a side wall 98 of valve stopper housing 90 to define a spring chamber 95 located between diaphragm 93 and a ceiling 96 of valve stopper housing 90. Spring 94 is located in spring chamber 95. A passageway 97 is provided to place spring chamber 95 and fuel vapor discharge conduit in fluid communication to allow fuel vapor extant in spring chamber 95 to be expelled through passageway 97 during movement of diaphragm 93 from the closed position to the opened position.

As also suggested in FIG. 8, first rollover valve 51 includes a valve housing 110 having an interior region 111 and a buoyant valve unit 112 arranged to move from an opened position shown in FIG. 8 to a closed position (not shown) closing vent port 113 formed in ceiling 114 of valve housing 110 in response to inversion or excessive tilting of vent unit 40. Buoyant valve unit 112 includes a float 115 and a spring 116 as suggested in FIG. 8.

As shown in FIG. 9, fill-limit vent valve 46 and flow-control valve 48 are opened during a tank-refueling activity as displaced fuel vapor in vapor space 25 is discharged from fuel tank 14 through fuel vapor discharge conduit 44 toward fuel vapor recovery canister 42. Fuel vapor is also discharged through fuel vapor recirculation conduit 68 toward sealed fuel-transfer conduit 72 in filler neck 12.

As shown in FIG. 10, fill-limit vent valve 46 has been moved to its closed position owing to exposure of a spring-biased buoyant float 85 in fill-limit vent valve 46 to rising level of liquid fuel 20 in interior region 24 of fuel tank 14. At this stage, flow-control valve 48 remains opened.

As shown in FIG. 11, a mid-level aspiration-induced vacuum 75 extant in vent line 64, fuel vapor recirculation conduit 68, and sealed fuel-transfer conduit 72 applies a downward suction force 49 to move flow-control valve 48 to the closed position. This closure takes place as shown in FIG. 4 just before fuel tank 14 is filled to capacity and then fuel-dispensing pump nozzle 26 is shut off automatically as shown in FIG. 5 when vacuum-sensitive nozzle shut-off mechanism 30 is exposed to high-level aspiration-induced vacuum 76 in sealed fuel-transfer conduit 72.

A process is disclosed herein for operating a vehicle fuel system including a fuel tank 14, a filler neck 12 coupled to tank 14, a fuel vapor recovery canister 42, and a fuel vapor conductor 44 communicating fuel vapor from fuel tank 14 to fuel vapor recovery canister 42, in series, first through a normally opened fill-limit vent valve 46 and second through, when opened, a normally closed flow-control valve 48. The process comprises the steps of opening normally closed flow-control valve 48, closing normally opened fill-limit vent valve 46, and using a vacuum 75 generated in filler neck 12 to close opened (but normally closed) flow-control valve 48.

Normally closed flow-control valve 48 is opened as suggested in FIGS. 2 and 9 to allow pressurized fuel vapor to flow from fuel tank 14 through fill-limit vent valve 46, flow-control valve 48, and fuel vapor conductor 44 to fuel vapor recovery canister 42 during discharge of liquid fuel 20 from a fuel-dispensing pump nozzle 26 into fuel tank 14 through filler neck 12 as long as liquid fuel 20 extant in fuel tank 14 remains below a fill-limit vent valve closure level 10 in fuel tank 14 associated with a first volume of liquid fuel in fuel tank 14. Normally opened fill-limit vent valve 46 is closed in response to accumulation of liquid fuel 20 in fuel tank 14 to an amount equal to the first volume of liquid fuel once liquid fuel rises to fill-limit vent valve closure level 101. Vacuum of a first magnitude 75 generated in filler neck 12 is used to close normally closed flow-control valve 48 that had been opened during the opening step to allow the vacuum generated in filler neck 12 to rise to a higher second magnitude 76 sufficient to activate a vacuum-sensitive nozzle shut-off mechanism 30 associated with fuel-dispensing pump nozzle 26 as suggested in FIG. 5 to halt further discharge of liquid fuel 20 into fuel tank 14 through filler neck 12.

In operation of vent unit 40 during tank refueling, fill-limit vent valve 46 closes and then flow-control valve 48 closes and fuel-dispensing pump nozzle 26 continues to dispense liquid fuel 20 into filler neck 12 to create an "aspiration-induced vacuum" in sealed fuel-transfer conduit 72 in filler neck 12. This aspiration-induced vacuum sucks on a "closed" chamber provided by vent line 64 and vapor recirculation conduit 68 causing the vacuum extant in sealed fuel-transfer conduit 72 to rise to a high-level aspiration-induced vacuum 76 as suggested in FIG. 5. Vacuum 76 corresponds to a "nozzle-shut-off" level and fuel-dispensing pump nozzle 26 indeed shuts off when vacuum-sensitive nozzle shut-off mechanism 30 is exposed to high-level aspiration-induced vacuum 76. Thus the fuel level 103 in fuel tank 14 is a bit higher than the fuel level 101 when fill-limit vent valve 46 closed. But now, when nozzle 26 is shut off, the pressure of fuel vapor in vapor space 25 is not as high since a high-pressure head is no longer needed to push liquid fuel 20 up filler neck 12 to reach vacuum-sensitive nozzle shut-off mechanism 30. Fewer hydrocarbon material is vented through vent unit 40 to fuel vapor recovery canister 42 owing to the lower head pressure of fuel vapor in fuel tank vapor space 25 at the end of each tank-refueling activity.

Fuel vapor recirculation conduit 68 functions to divert some of the fuel vapor generated in fuel tank 14 during tank refueling to minimize flow of hydrocarbon material to fuel vapor recovery canister 42 during tank-refueling activity. The functionality of vent unit 40 allows for fewer hydrocarbon materials to be generated during refueling and, of the hydrocarbon materials that are generated during refueling, fewer hydrocarbon materials will be sent to carbon canister 32 for storage. By sending fewer hydrocarbons to canister 42, the canister size can be made smaller. Valve unit 48 cooperates with fuel vapor recirculation line 68 and sealed fuel-transfer conduit 72 to create vacuum conditions exposed to vacuum-sensitive nozzle-shutoff mechanism 30 associated with pump nozzle 26 to shut off and to set the fuel tank liquid level in fuel tank 14. Current fuel systems require liquid fuel to contact the refueling nozzle to shut the refueling nozzle off.

The invention claimed is:

1. A refueling shut-off system for use with a fuel vapor recovery canister and a fuel tank formed to include an interior region for containing fuel vapor and liquid fuel, the system comprising
a filler neck adapted to be coupled to fuel tank at a first end, the filler neck being formed to include an open mouth at an opposite second end and a fuel-conducting passageway extending between the first and second ends and communicating with an interior region of the fuel tank,
a fuel vapor discharge conduit formed to include an outlet end adapted to mate with the fuel vapor recovery canister to discharge fuel vapor flowing in the fuel vapor discharge conduit into the fuel vapor recovery canister,
a vent unit adapted to be coupled to the fuel tank and configured to receive and regulate flow of fuel vapor discharged from the interior region of the fuel tank to the fuel vapor discharge conduit for delivery to the fuel vapor recovery canister, the vent unit including a vent line formed to include an inlet and an outlet, a vent channel formed to include an outlet coupled to the fuel vapor discharge conduit to discharge any fuel vapor flowing in the vent channel into the fuel vapor discharge conduit, a normally closed flow-control valve formed to include an inlet port coupled to the outlet of the vent line and an outlet port coupled to an inlet end of the fuel vapor discharge conduit to allow fuel vapor discharged from the normally closed flow-control valve to flow into the fuel vapor discharge conduit and toward a fuel vapor recovery canister coupled to the outlet end of the fuel vapor discharge conduit, a normally opened fill-limit vent valve formed to include an inlet port adapted to be exposed to fuel vapor extant in the interior region of the fuel tank and an outlet port coupled to the inlet of the vent line to allow fuel vapor discharged from the normally opened fill-limit vent valve to reach the normally closed flow-control valve, and a normally opened first rollover valve formed to include an inlet port adapted to be exposed to fuel vapor extant in the interior region of the fuel tank and an outlet port coupled to an inlet formed in the vent channel to allow fuel vapor discharged from the normally opened first rollover valve to flow into the fuel vapor discharge conduit and toward a fuel vapor recovery canister coupled to the outlet end of the fuel vapor discharge outlet, and
a fuel vapor recirculation conduit configured to interconnect the vent line and the fuel-conducting passageway formed in the filler neck in fluid communication, the fuel vapor recirculation conduit including a one-way liquid-fuel check valve configured to allow flow of fuel vapor discharged from the vent line through the fuel vapor recirculation conduit into the fuel-conducting passageway formed in the filler neck and to block flow of liquid fuel passing from the fuel-conducting passageway into the fuel vapor recirculation conduit into the vent line.

2. The system of claim 1, wherein the normally closed flow-control valve includes a valve stopper housing having an interior region receiving the outlet end of the vent line therein, a stopper mounted for movement in the interior region of the valve stopper housing between a closed position mating with the outlet end of the vent line to block flow of fuel vapor from the vent line into the fuel vapor discharge conduit and an opened position disengaging the outlet end of the vent line to allow fuel vapor discharged from the outlet end of the vent line to flow into the fuel vapor discharge conduit, and spring means for yieldably urging the stopper normally to the closed position and allowing the stopper to move from the closed position to the opened position in response to discharge of pressurized fuel vapor having a pressure magnitude in excess of a predetermined minimum from the normally opened fill-limit vent valve into the vent line during fuel tank refueling so that the pressurized fuel vapor exiting the fuel tank through the normally opened fill-limit vent valve is discharged into the fuel vapor discharge conduit via the normally closed flow-control valve while the stopper is moved to the opened position.

3. The system of claim 2, wherein the normally opened fill-limit vent valve includes a valve closure housing formed to include the inlet and outlet ports, a closure arranged to move in the valve closure housing between an opened position allowing flow of fuel vapor exiting the interior region of the fuel tank into the vent line and a closed position blocking flow of fuel vapor extant in the interior region of the fuel tank into the vent line, and means for moving the closure from a normally opened position to the closed position in response to accumulation of liquid fuel in the interior region of the fuel tank to a first predetermined amount defining a fill-limit vent valve closure level in the fuel tank to block flow of pressurized fuel vapor from a vapor space provided in the interior region of the fuel tank into the vent line included in the vent unit.

4. The system of claim 3, wherein the fuel vapor recirculation conduit is configured to provide vacuum generator means for applying a mid-level aspiration-induced vacuum to the vent line while the closure of the normally opened fill-limit vent valve is located in the closed position upon accumulation of liquid fuel in the interior region of the fuel tank to a second predetermined amount greater than the first predetermined amount and defining a flow-control valve closure level and in response to downward flow of liquid fuel in the fuel-conducting passageway of the filler neck toward the first end thereof to cause the stopper to move from the opened position to assume the closed position before a relatively higher high-level aspiration-induced vacuum is generated in the fuel-conducting passageway by continued downward flow of liquid fuel in the fuel-conducting passageway of the filler neck to activate a vacuum-sensitive nozzle shut-off mechanism associated with a fuel-dispensing pump nozzle inserted into the fuel-conducting passageway through the open mouth of the filler neck and used to establish the downward flow of liquid fuel in the fuel-conducting passageway of the filler neck.

5. The system of claim 4, wherein the fuel vapor recirculation conduit is configured to provide high-level vacuum generator means for applying a high-level aspiration-induced vacuum that is greater than the mid-level aspiration-induced vacuum to the vent line while the closure of the normally opened fill-limit vent valve is located in the closed position upon accumulation of liquid fuel in the interior region of the fuel tank to a third predetermined amount greater than the second predetermined amount and in response to continued downward flow of liquid fuel in the fuel-conducting passageway of the filler neck to generate a vacuum in the fuel-conducting passageway sufficient to activate a vacuum-sensitive nozzle shut-off mechanism associated with a fuel-dispensing pump nozzle inserted into the fuel-conducting passageway through the open mouth of the filler neck and used to establish the downward flow of liquid fuel in the fuel-conducting passageway of the filler neck.

6. The system of claim 4, wherein the filler neck is formed to include at the first end an inlet check valve and at the open mouth a sealed nozzle admission port configured to admit a fuel-discharge outlet of a fuel-dispensing pump nozzle into the fuel-conducting passageway of the filler neck to establish a sealed connection therebetween so as to establish a sealed fuel-transfer conduit located in the fuel-conducting passageway between the inlet check valve and the sealed nozzle admission port and arranged to receive a vacuum-sensitive nozzle shut-off mechanism associated with a fuel-dispensing pump nozzle inserted into the fuel-conducting passageway through the sealed nozzle admission port and wherein the fuel vapor recirculation conduit is arranged to open into the sealed fuel transfer conduit established in the fuel-conducting passageway of the filler neck.

7. The system of claim 3, wherein the valve stopper housing of the normally closed flow-control valve includes a ceiling and a side wall arranged to extend downwardly from the ceiling and arranged to extend around the outlet end of the vent line, the stopper is a diaphragm made of a sealing material and having a peripheral edge coupled to the side wall to locate the stopper in a position under the ceiling of the valve stopper housing and above the outlet end of the vent line and to define a spring chamber located between the ceiling and the stopper, and the spring means is located in the spring chamber, and wherein the normally closed flow-control valve further includes passageway means for placing the spring chamber and the fuel vapor discharge conduit in fluid communication to allow fuel vapor extant in the spring chamber to be expelled to the fuel vapor discharge conduit during movement of the stopper from the closed position to the opened position.

8. The system of claim 7, wherein the normally opened fill-limit vent valve is adapted to be coupled to the fuel tank to extend into the interior region of the fuel tank and is arranged to underlie the normally closed flow-control valve.

9. The system of claim 1, further comprising an exhaust conduit formed to include an outlet coupled to the fuel vapor discharge conduit and a normally opened second rollover valve formed to include an inlet port adapted to be exposed to fuel vapor extant in the interior region of the fuel tank and an outlet port coupled to an inlet of the exhaust conduit to allow fuel vapor discharged from the vapor space provided in the interior region of the fuel tank to flow into the fuel vapor discharge conduit toward a fuel vapor recovery canister coupled to the outlet end of the fuel vapor discharge outlet.

10. A refueling shut-off system for use with a fuel vapor recovery canister and a fuel tank formed to include an interior region for containing fuel vapor and liquid fuel, the system comprising a filler neck adapted to be coupled to fuel tank at a first end, the filler neck being formed to include an open mouth at an opposite second end and a fuel-conducting passageway extending between the first and second ends and communicating with an interior region of the fuel tank, a fuel vapor discharge conduit formed to include an outlet end adapted to mate with the fuel vapor recovery canister to discharge fuel vapor flowing in the fuel vapor discharge conduit into the fuel vapor recovery canister, a vent unit adapted to be coupled to the fuel tank and configured to receive and regulate flow of fuel vapor discharged from the interior region of the fuel tank to the fuel vapor discharge conduit for delivery to the fuel vapor recovery canister, the vent unit including a vent line formed to include an inlet and an outlet, a normally closed flow-control valve formed to include an inlet port coupled to the outlet of the vent line and an outlet port coupled to an inlet end of the fuel vapor discharge conduit to allow fuel vapor discharged from the normally closed flow-control valve to flow into the fuel vapor discharge conduit and toward a fuel vapor recovery canister coupled to the outlet end of the fuel vapor discharge conduit, and a normally opened fill-limit vent valve formed to include an inlet port adapted to be exposed to fuel vapor extant in the interior region of the fuel tank and an outlet port coupled to the inlet of the vent line to allow fuel vapor discharged from the normally opened fill-limit vent valve to reach the normally closed flow-control valve, and a fuel vapor recirculation conduit configured to interconnect the vent line and the fuel-conducting passageway formed in the filler neck in fluid communication to communicate an aspiration-induced vacuum generated in the fuel-conducting passageway during fuel tank refueling to the normally closed flow-control valve.

11. The system of claim 10, wherein the normally closed flow-control valve includes a valve stopper housing having an interior region receiving the outlet end of the vent line therein, a stopper mounted for movement in the interior region of the valve stopper housing between a closed position mating with the outlet end of the vent line to block flow of fuel vapor from the vent line into the fuel vapor discharge conduit and an opened position disengaging the outlet end of the vent line to allow fuel vapor discharged from the outlet end of the vent line to flow into the fuel vapor discharge conduit, and spring means for yieldably urging the stopper normally to the closed position and allowing the stopper to move from the closed position to the opened position in response to discharge of pressurized fuel vapor having a pressure magnitude in excess of a predetermined minimum from the normally opened fill-limit vent valve into the vent line during fuel tank refueling so that the pressurized fuel vapor exiting the fuel tank through the normally opened fill-limit vent valve is discharged into the fuel vapor discharge conduit via the normally closed flow-control valve while the stopper is moved to the opened position.

12. The system of claim 11, wherein the normally opened fill-limit vent valve includes a valve closure housing formed to include the inlet and outlet ports, a closure arranged to move in the valve closure housing between an opened position allowing flow of fuel vapor exiting the interior region of the fuel tank into the vent line and a closed position blocking flow of fuel vapor extant in the interior region of the fuel tank into the vent line, and means for moving the closure from a normally opened position to the closed position in response to accumulation of liquid fuel in the interior region of the fuel tank to a first predetermined amount defining a fill-limit valve closure level in the fuel tank to block flow of pressurized fuel vapor from a vapor space provided in the interior region of the fuel tank into the vent line included in the vent unit.

13. The system of claim 12, wherein the fuel vapor recirculation conduit is configured to provide means for applying a mid-level vacuum to the vent line while the closure of the normally opened fill-limit valve is located in the closed position in response to downward flow of liquid fuel in the fuel-conducting passageway of the filler neck toward the first end thereof to cause the stopper to move from the opened position to assume the closed position before a relatively higher high-level vacuum is generated in the fuel-conducting passageway by continued downward flow of liquid fuel in the fuel-conducting passageway of the filler neck to activate a vacuum-sensitive nozzle shut-off mechanism associated with a fuel-dispensing pump nozzle inserted into the fuel-conducting passageway through the open mouth of the filler neck and used to establish the downward flow of liquid fuel in the fuel-conducting passageway of the filler neck.

14. The system of claim 11, wherein the valve stopper housing of the normally closed flow-control valve includes a ceiling and a side wall arranged to extend downwardly from the ceiling and arranged to extend around the outlet end of the vent line, the stopper is a diaphragm made of a sealing material and having a peripheral edge coupled to the side wall to locate the stopper in a position under the ceiling of the valve stopper housing and above the outlet end of the vent line and to define a spring chamber located between the ceiling and the stopper, the spring means is located in the spring chamber, and wherein the normally closed flow control valve further includes passageway means for placing the spring chamber and the fuel vapor discharge conduit in fluid communication to allow fuel vapor extant in the spring chamber to be expelled to the fuel vapor discharge conduit during movement of the stopper from the closed position to the opened position.

15. A process for operating a vehicle fuel system including a fuel tank, a filler neck coupled to the tank, a fuel vapor recovery canister, and a fuel vapor conductor communicating fuel vapor from the fuel tank to the fuel vapor recovery canister, in series, first through a normally opened fill-limit vent valve and second through, when opened, a normally closed flow-control valve, the process comprising the steps of opening the normally closed flow-control valve to allow pressurized fuel vapor to flow from the fuel tank through the fill-limit vent valve, the flow-control valve, and the fuel vapor conductor to the fuel vapor recovery canister during discharge of liquid fuel from a fuel-dispensing pump nozzle into the fuel tank through the filler neck as long as liquid fuel extant in the fuel tank remains below a fill-limit vent valve closure level in the fuel tank associated with a first volume of liquid fuel in the fuel tank, closing the normally opened fill-limit vent valve in response to accumulation of liquid fuel in the fuel tank to an amount equal to the first volume of liquid fuel once liquid fuel rises to the fill-limit vent valve closure level, and using a vacuum of a first magnitude generated in the filler neck to close the normally closed flow-control valve that had been opened during the opening step to allow the vacuum generated in the filler neck to rise to a higher second magnitude sufficient to activate a vacuum-sensitive nozzle shut-off mechanism associated with the fuel-dispensing pump nozzle to halt further discharge of liquid fuel into the fuel tank through the filler neck.

* * * * *